United States Patent [19]

Beach

[11] Patent Number: 4,705,021
[45] Date of Patent: Nov. 10, 1987

[54] GAS BURNER CONSTRUCTION

[75] Inventor: Stanley H. Beach, Indianapolis, Ind.

[73] Assignee: The Maytag Company, Newton, Iowa

[21] Appl. No.: 22,366

[22] Filed: Mar. 5, 1987

[51] Int. Cl.⁴ ............................................. A47J 37/00
[52] U.S. Cl. ................................ 126/41 R; 126/39 R; 126/39 E; 239/566; 431/354
[58] Field of Search ............ 431/349, 354; 126/21 R, 126/21 A, 39 R, 39 E, 37 R, 41 R, 41 A, 41 B, 41 C, 41 D, 41 E; 239/567, 600, 557, 566

[56] References Cited

U.S. PATENT DOCUMENTS

| | | | |
|---|---|---|---|
| 1,149,686 | 8/1915 | Reedy | 239/553 |
| 1,908,668 | 5/1933 | Hollman | 126/39 E |
| 2,029,718 | 2/1936 | Hobson et al. | 126/41 D |
| 4,055,132 | 10/1977 | Stohrer, Jr. et al. | 72/326 |
| 4,092,975 | 6/1978 | Grammatopoulos | 126/41 R |
| 4,305,372 | 12/1981 | Hahn | 126/41 R |

Primary Examiner—Margaret A. Focarino
Attorney, Agent, or Firm—Richard L. Ward

[57] ABSTRACT

A gas burner construction is porvided which is completely free of any upwardly facing horizontal plane surfaces. This burner construction is especially adapted for cooking food with an open flame since there are no surfaces on which drippings may collect and cause flare-ups.

7 Claims, 17 Drawing Figures

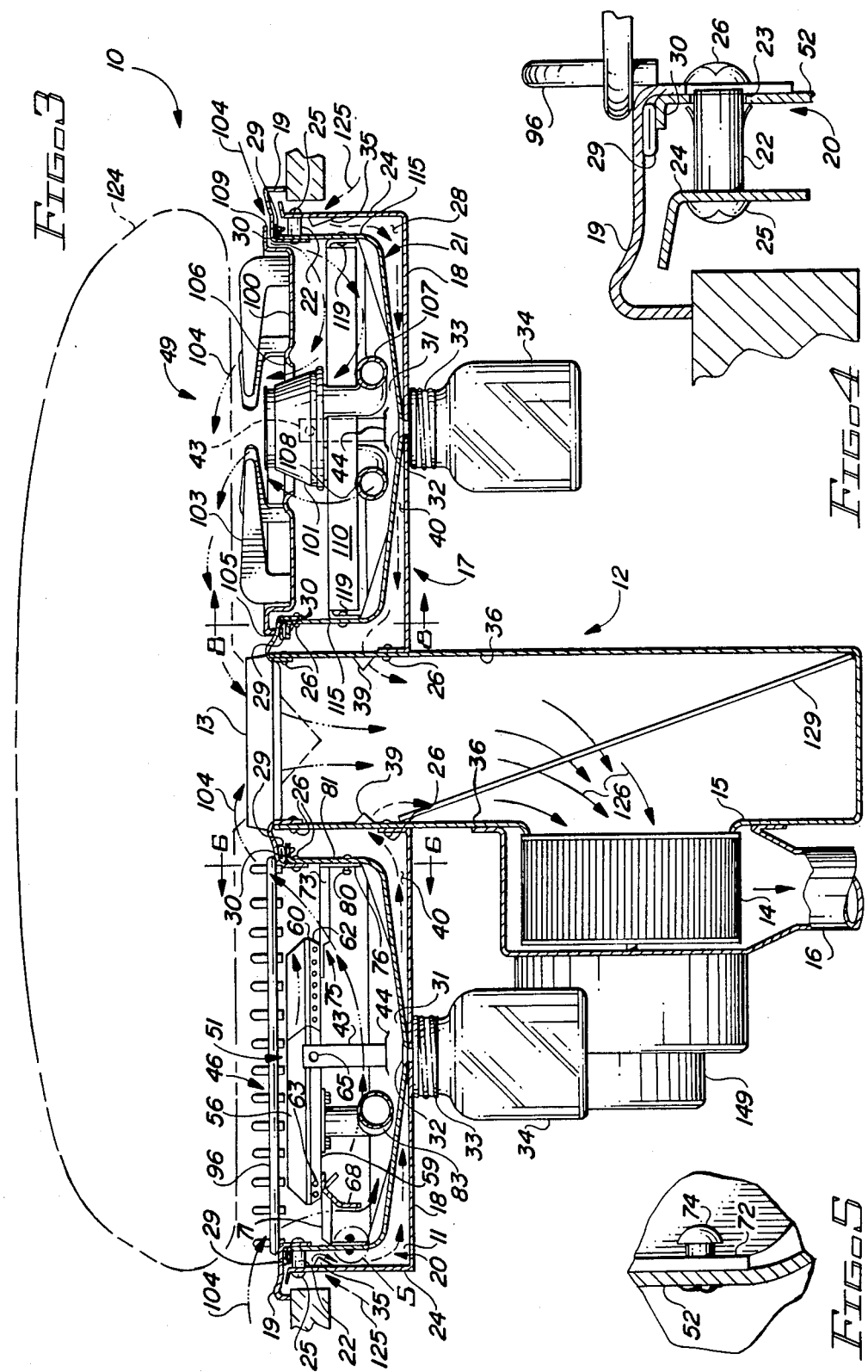

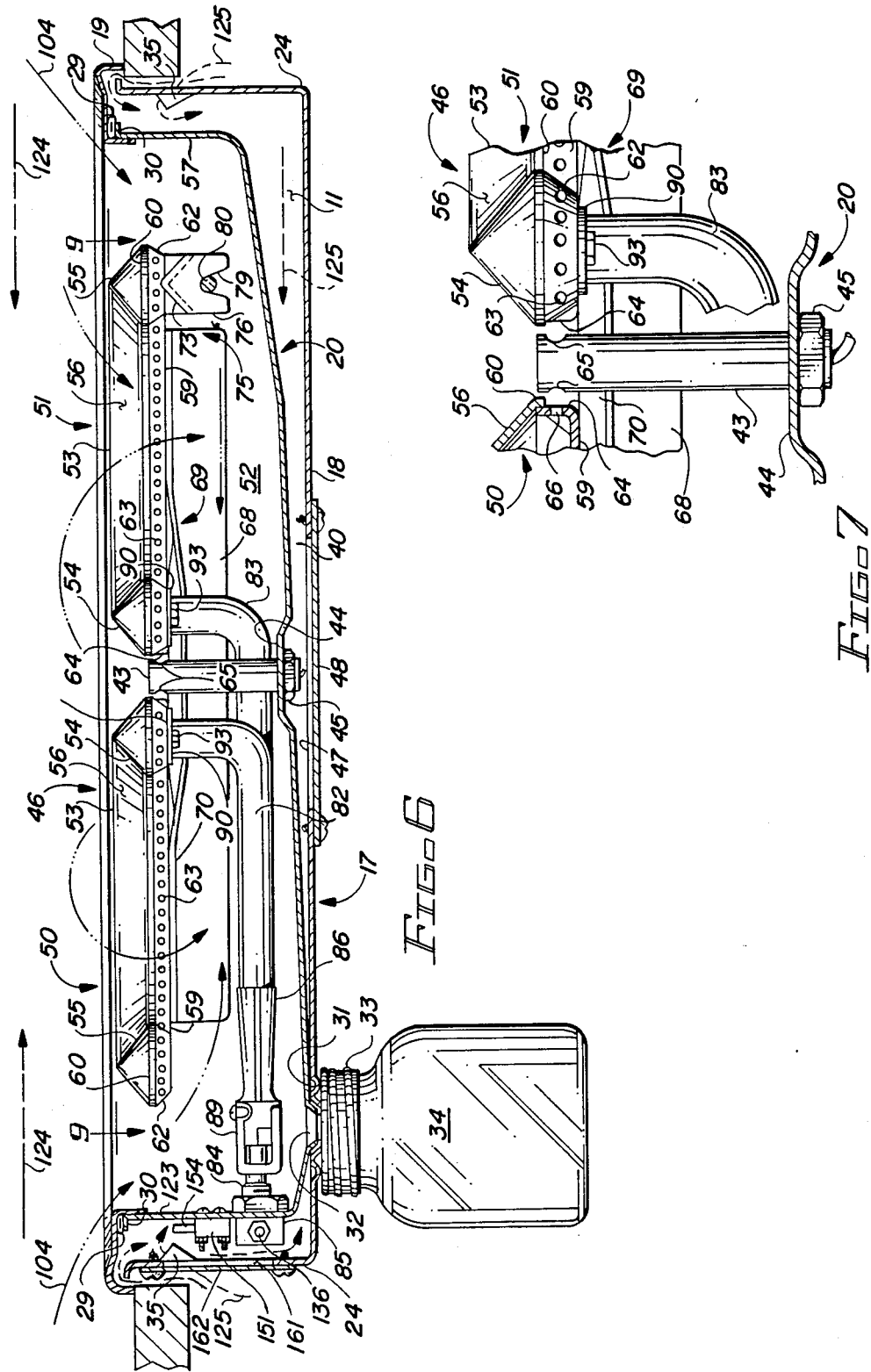

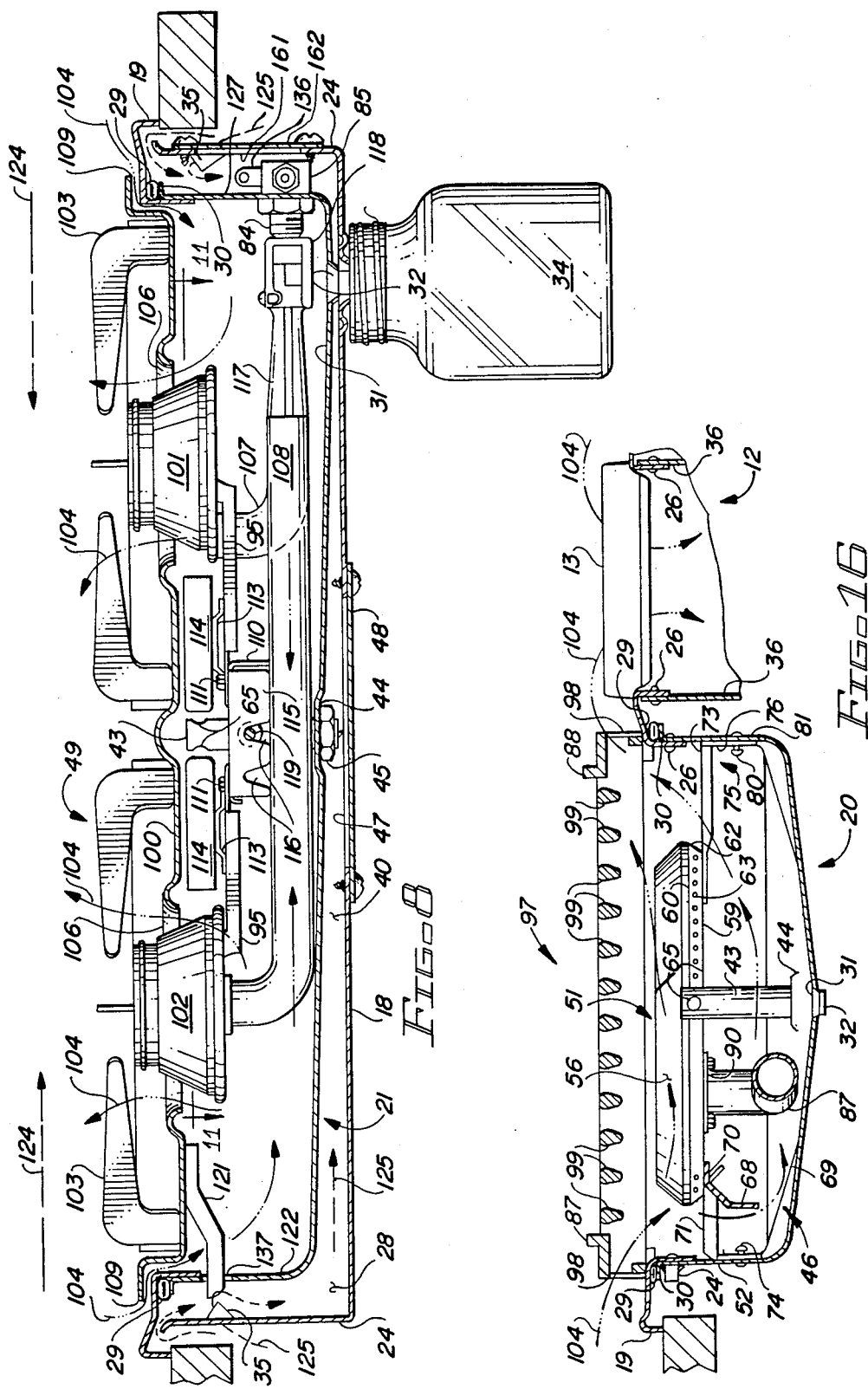

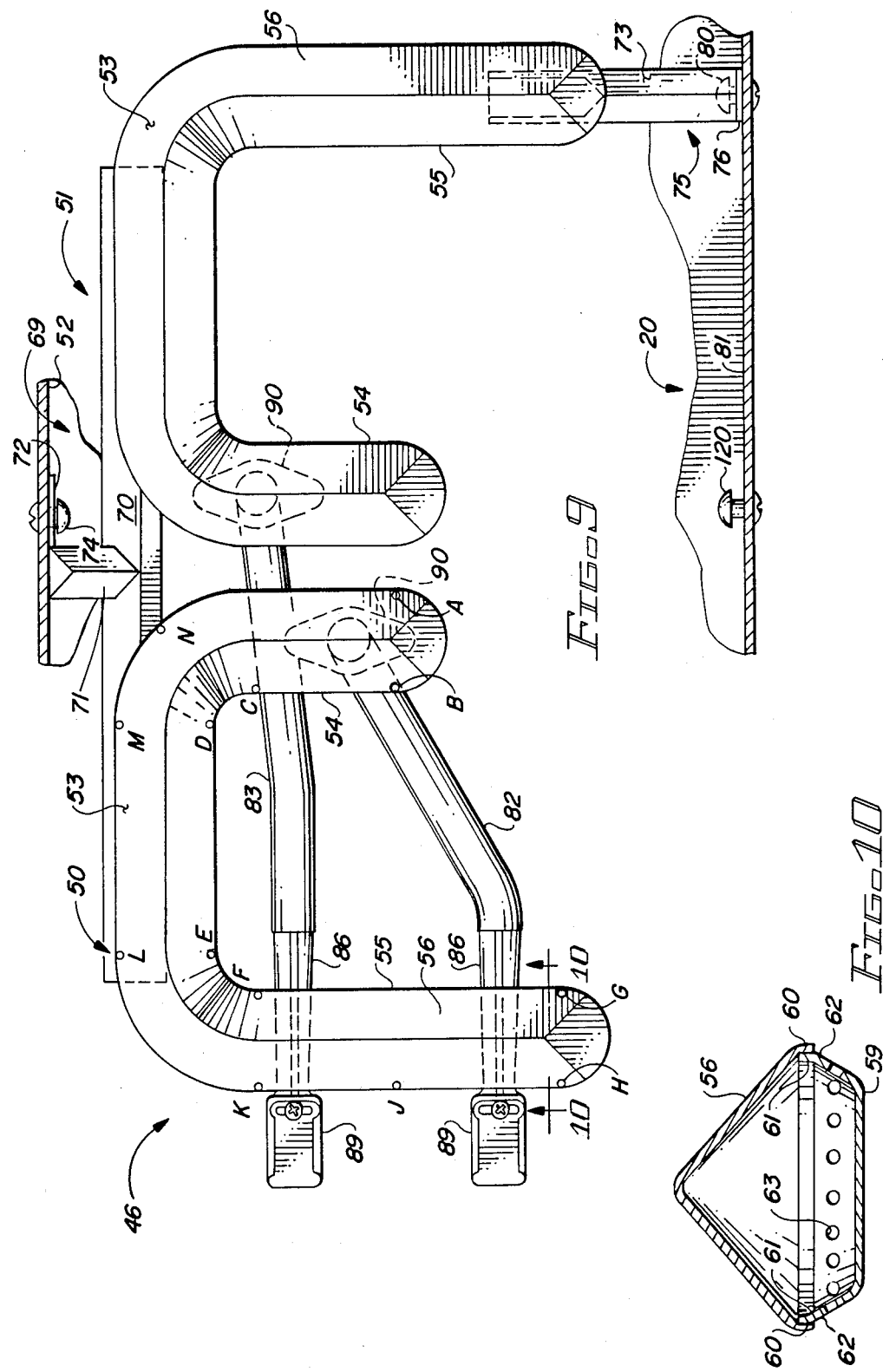

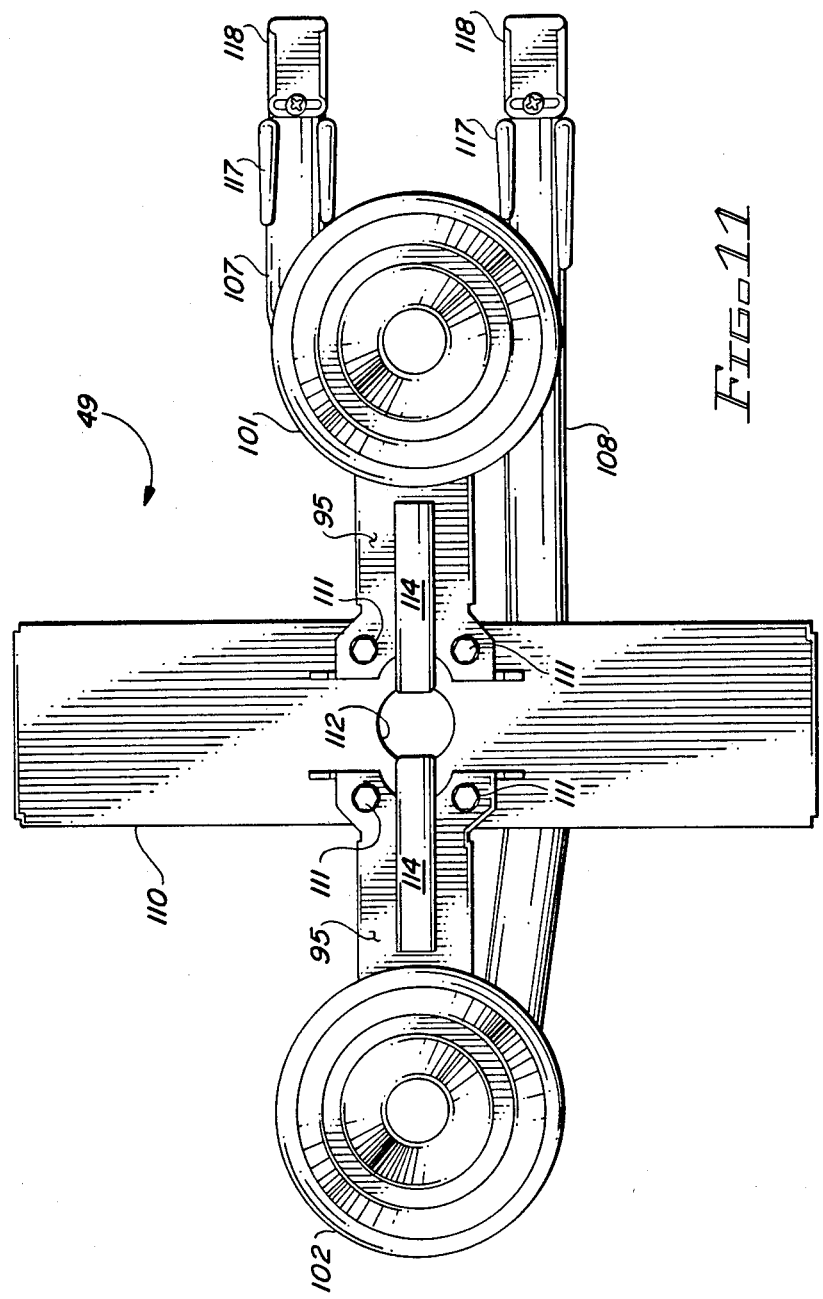

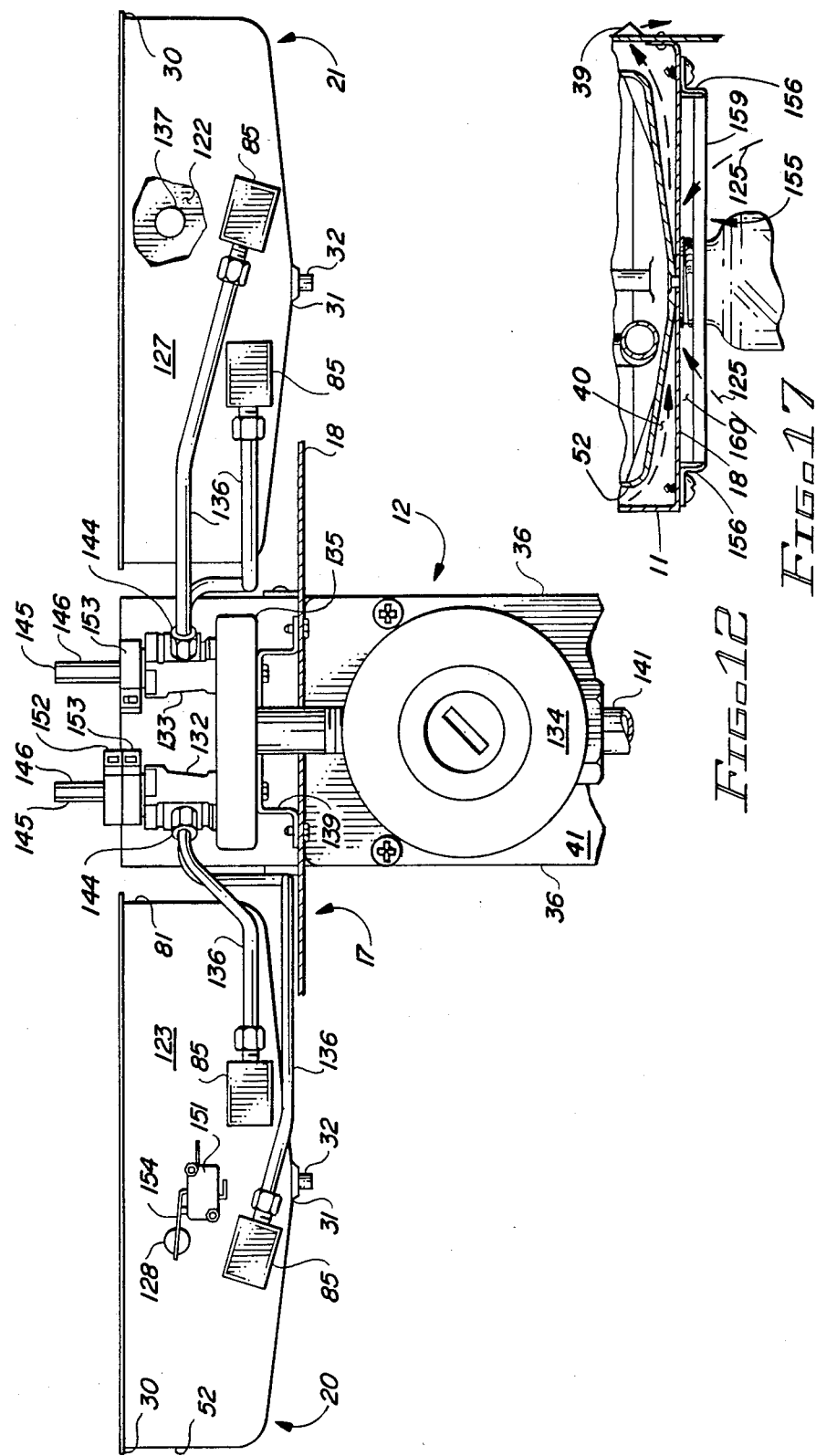

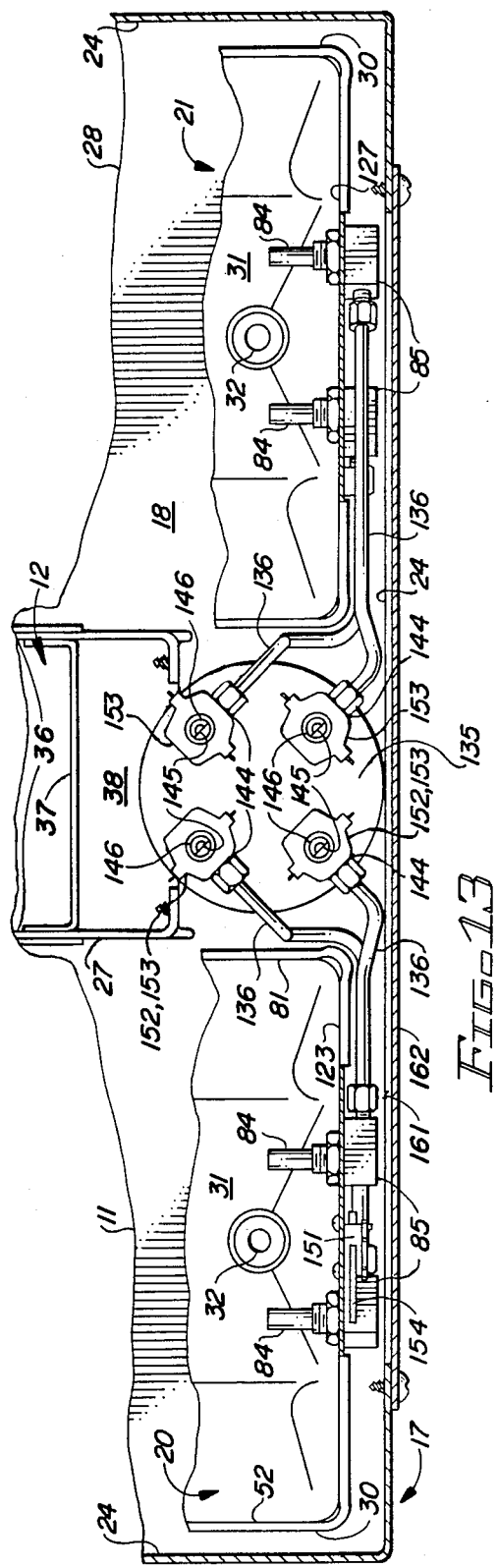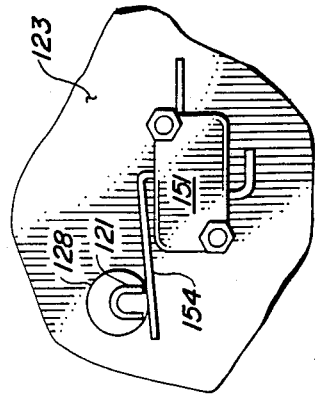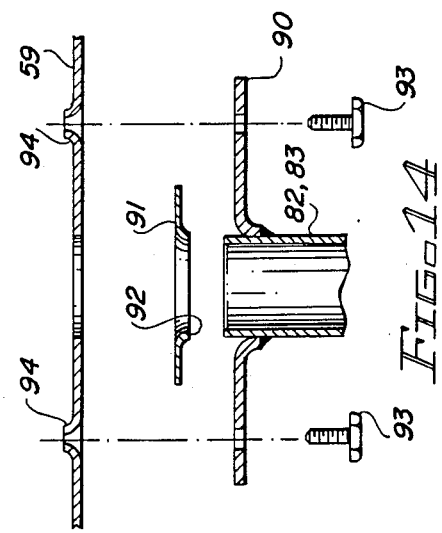

GAS BURNER CONSTRUCTION

BACKGROUND OF THE INVENTION

This invention relates generally to the construction of gas grill burners and in particular to a gas grill burner constructed so that it is completely free of any upwardly facing horizontal plane surfaces. The absence of these upwardly facing horizontal plane surfaces prevents the collection of grease drippings from meat as it is cooked on a grill surface located above the gas grill burner.

Typical previously known gas grill burners are disclosed by Stohrer, Jr. et al. in U.S. Pat. No. 4,055,132 issued Oct. 25, 1977; Grammatopoulos in U.S. Pat. No. 4,092,975 issued on June 6, 1978 and Hahn in U.S. Pat. No. 4,305,372 issued Dec. 15, 1981. In each of these grill burner assemblies, the top and bottom halves are joined by a crimped flange arrangement disposed in a generally horizontal plane which forms an eave arrangement over gas ports which are located in the lower burner half. Each of these grill burner assemblies thus presents flat horizontal plane surfaces on which meat drippings can fall and potentially cause flare-ups.

The prior art has thus shown grill burners which are assembled by crimping metal surfaces together. This construction provides for a surface which can collect meat drippings and thus promotes flare-ups while cooking. There has been no known showing of a gas grill burner as described herein which is completely free of upwardly facing horizontal plane surfaces.

SUMMARY OF THE INVENTION

It is therefore an object of the instant invention to provide an improved gas grill burner.

It is a further object of the instant invention to provide a gas grill burner which is free of upwardly facing horizontal plane surfaces.

It is a still further object of the instant invention to provide a gas grill burner which promotes the drainage of meat drippings to prevent flare-up.

Briefly, the instant invention achieves these objects in a gas burner for cooking food with an open flame. Structure is provided defining a generally hollow horizontally elongated burner body including an upper body portion and a lower body portion. The upper body portion has a downwardly extending first peripheral flange and an imperforate top wall extending inwardly and upwardly from the first peripheral flange. All plane surfaces of the first peripheral flange and the top wall are disposed only in vertical and angular planes to define an upper body portion free of upwardly facing horizontal plane surfaces. The lower body portion has an upwardly extending second peripheral flange mating with the downwardly extending first peripheral flange and further having a bottom wall extending inwardly and downwardly from the second peripheral flange. The downwardly extending first peripheral flange overlaps and is continuously connected with the upwardly extending second peripheral flange to form a burner body completely free of upwardly facing horizontal plane surfaces on which drippings may collect and cause flare-ups. A plurality of gas ports are formed in the bottom wall of the lower body portion and are spaced about the periphery thereof. The gas ports are located beneath the widest portion of the burner body for preventing contamination from above. Apparatus is provided for supplying the burner body with a combustible mixture of gas and air.

Details of the gas burner and further objects and advantages thereof will become evident as the description proceeds and from an examination of the accompanying eight sheets of drawings.

BRIEF DESCRIPTION OF THE DRAWINGS

The drawings illustrate a preferred embodiment of the invention with similar numerals referring to similar parts throughout the several views, wherein:

FIG. 3 is a section view taken generally along lines 3—3 of FIG. 1;

FIG. 4 is an enlarged fragmentary section view showing the attachment of the burner box and cover to the burner pans;

FIG. 5 is an enlarged fragmentary section view showing the mounting support arrangement for the burner units within the burner pans;

FIG. 6 is a section view taken generally along lines 6—6 of FIG. 3;

FIG. 7 is an enlarged fragmentary section view showing the mounting of the igniter and the charge port arrangement for the grill burner unit;

FIG. 8 is a section view taken generally along lines 8—8 of FIG. 3;

FIG. 9 is a view of the grill burner unit taken generally along lines 9—9 of FIG. 6;

FIG. 10 is an enlarged cross sectional view taken through the grill burner unit along lines 10—10 of FIG. 9;

FIG. 11 is a view of the surface burner unit removed from the cooking unit but taken generally along lines 11—11 of FIG. 8;

FIG. 12 is a partial section view taken generally along lines 12—12 of FIG. 1 and showing the gas manifold and gas distribution system;

FIG. 13 is a top plan view of the gas distribution system shown in FIG. 12;

FIG. 14 is a section view showing the attachment of the gas mixer tubes to the gas burners of the grill burner unit;

FIG. 15 is a fragmentary view showing the microswitch of FIGS. 12 and 13 in the actuated posture;

FIG. 16 is shown out of order with FIG. 8 and is a section view similar to FIG. 3 showing the left burner pan area and the preferred cooking grate construction; and FIG. 17 is a fragmentary cross sectional view shown out of order with FIG. 12 and showing another embodiment of the burner box having a baffle attached to the bottom wall thereof.

DESCRIPTION OF A PREFERRED EMBODIMENT

Figure 1:
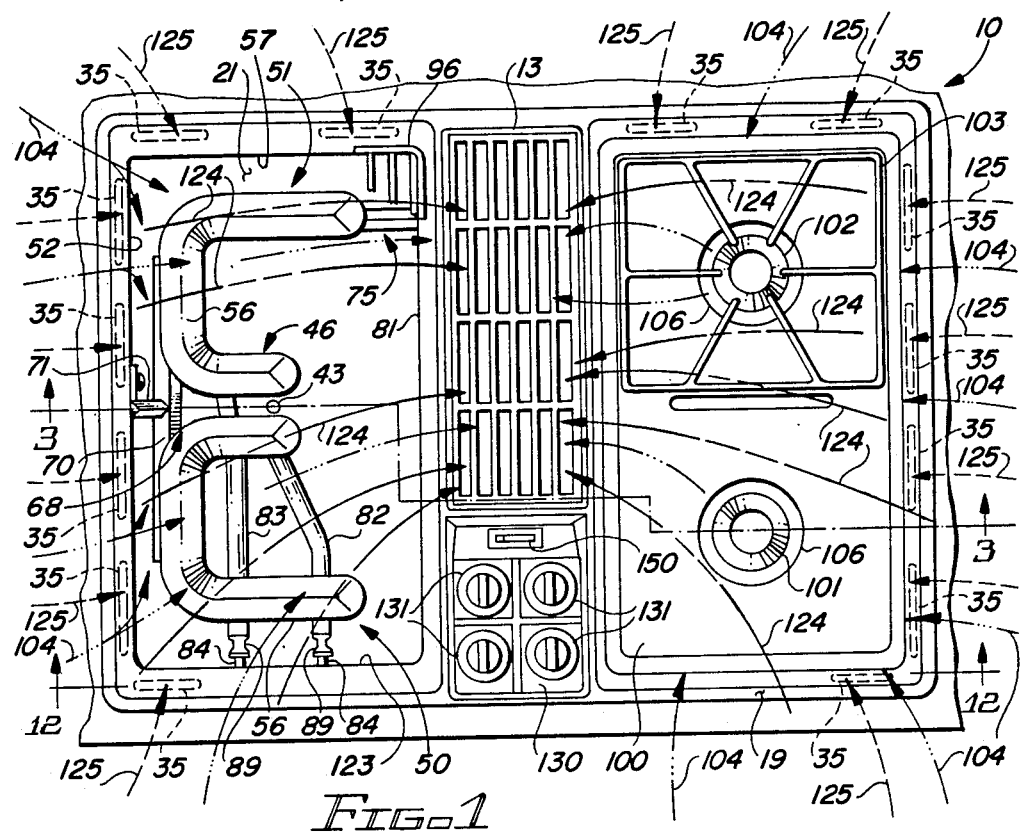
FIG. 1 is a top plan view of a gas downdraft countertop cooking unit.

Referring now to the drawings and in particular to FIGS. 1 and 3, there is shown a drop-in countertop cooking unit 10 of the gas downdraft type. It is to be understood that the concepts embodied in the drop-in countertop cooking unit 10 of this preferred embodiment can also be applied to free-standing or built-in type gas cooking ranges.

As shown in FIGS. 3, 6, 8, 12 and 13, the countertop cooking unit 10 includes a sheet metal housing 17 having a bottom wall 18 and upwardly extending side walls numbered 24. As best shown in FIG. 13, the bottom wall 18 of the housing 17 has a substantially rectangular opening 27 in the central portion thereof for receiving a rectangular exhaust enclosure 12. The exhaust or plenum enclosure 12 is front-to-rear elongated and effectively divides the housing 17 into left and right burner boxes 11 and 28. The exhaust enclosure 12 includes an elongated air intake opening at the top which defines the entrance thereto. An exhaust blower 14 is located adjacent the exhaust opening 15 of the exhaust enclosure 12 and is connected to atmosphere via the duct 16.

As best shown in FIGS. 12 and 13, the side walls 36 of the exhaust enclosure 12 extend forwardly of the front wall 37 to form a compartment 38 for mounting electrical components. A cover plate 41 attaches to the front of the compartment 38 with threaded fasteners to provide accessibility to the various electrical components.

Referring again to FIGS. 1 and 3 in particular, a frame-like cover 19 generally overlies the housing 17 and the exhaust enclosure 12 and, as shown in FIG. 4, is rigidly attached to the side walls 24 of the housing 17 and to the left and right burner pans 20 and 21 as will be further discussed herein. The cover 19 includes rectangular openings at the two sides which are substantially aligned with the burner boxes 11 and 28 and a generally centrally located front-to-rear elongated rectangular opening aligned with the elongated air intake opening of the exhaust exclosure 12 for receiving the air intake grating 13. The cover 19 is mechanically secured to the burner pans 20 and 21 by a plurality of fasteners 26 such as rivets or thread-cutting sheet metal screws. As best shown in FIGS. 3 and 4, the housing 17 is assembled to the combination of burner pans 20 and 21 and cover 19 by means of a plurality of threaded spring steel spacers 22 which are inserted into square holes 23 in the burner pans 20 and 21 and extend outwardly toward the side walls 24 of the housing 17. Threaded fasteners 25 extend through the side walls 24 of the housing 17 and engage with the spacers 22 to mechanically fasten the housing 17 to the previously assembled combination of burner pans 20 and 21 and cover 19. Thus the burner pans 20 and 21 are fixedly mounted within the burner boxes 11 and 28 defined by the housing 17 and exhaust enclosure 12. The air intake opening of the exhaust enclosure 12, in the preferred embodiment, is in closely spaced parallel relation to and is substantially longitudinally coextensive with the burner pans 20 and 21.

As best shown in FIG. 4, the periphery of the burner pans 20 and 21 is sealed to the underside of the cover 19 by a flexible, heat resistant, seal 29 inserted between a burner pan flange 30 and the underside of the cover 19. The burner pans 20 and 21 are thus effectively sealed from the burner boxes 11 and 28 so that there is virtually no leakage of combustion air from the burner pans 20 and 21 into the burner boxes 11 and 28. As an alternate construction, it is anticipated that the cover 19 and burner pans 20 and 21 could be formed as a unitary part from a single sheet of metal. In this proposed alternate construction the seal 29 would be eliminated.

As best shown in FIGS. 3, 6 and 8, each burner pan 20 and 21 slopes downwardly from the rear toward the front of the countertop cooking unit 10 and includes a sump area 31. Each sump area 31 has a tube 32 which extends downwardly through the bottom wall 18 of the housing 17 and through jar lids 33 secured to the bottom wall 18. The jar lids 33 are threaded and each receives a jar or container 34 for collecting drippings and various cooking spills.

Referring now to FIGS. 1, 3, 6 and 8, it can be seen that the outer periphery of the housing 17 includes a first plurality of louvers 35 in the walls 24 defining air inlets into the area of the burner boxes 11 and 28. The side walls 36 of the exhaust enclosure 12 form one side wall of each burner box 11 and 28 and include a second plurality of louvers 39 defining air outlets from the burner boxes 11 and 28 into the exhaust enclosure 12 as best shown in FIG. 3. Thus airflow channels 40 are established between the first and second plurality of louvers 35 and 39 which are isolated from the interior of the burner pans 20 and 21 and which are utilized for cooling the burner pans 20 and 21. When the exhaust blower 14 as shown in FIG. 3 is operational, cooling airflow will be drawn into the airflow channels 40 through the first plurality of louvers 35 to wash the walls of the burner pans 20 and 21 for removing heat therefrom. The cooling airflow will be drawn into the exhaust enclosure 12 through the second plurality of louvers 39 and will be discharged to atmosphere.

Turning now to FIGS. 3 and 6–8, a spark igniter 43 is shown generally centrally located within each non-removable burner pan 20 or 21. Each spark igniter 43 is secured to a formed flat area 44 in the bottom wall of each burner pan 20 and 21 by means of a threaded fastener such as a jam nut 45 or other means of fastening engageable with the body of the spark igniter 43. The spark igniters 43 have a conductive outer casing which is effectively grounded to the burner pan 20 or 21 when the threaded fastener 45 is secured. The grill burner unit 46 and the surface burner unit 49 are each removable from their respective non-removable burner pans 20 and 21 without disturbing the spark igniters 43. The construction of the instant invention is not to be limited only to the illustrated spark igniters 43 but could also include a centrally located glow coil, glow bar or a standing pilot light.

As best shown in FIGS. 6 and 8, the bottom wall 18 of each of the burner boxes 11 and 28 includes a generally rectangular access opening 47 directly below the igniters 43. The access opening 47 is normally closed by an access cover 48 held in place by sheet metal screws.

FIGS. 6, 7, 9, 10 and 14 depict the grill burner unit 46 which is typically mounted exclusively within the left burner pan 20 as well as various construction details thereof. The grill burner unit 46 shown in these drawings is particularly designed for use with a forced air downdraft ventilation system. As best shown in FIGS. 6, 7 and 9, the grill burner unit 46 is comprised of front and rear generally C-shaped gas burners 50 and 51 which are substantially mirror images of each other with the main body portions 53 located adjacent the left or outside wall 52 of the left burner pan 20 opposite the air intake grating 13 of the exhaust enclosure 12. The C-shaped gas burners 50 and 51 each include a body portion 53 generally parallel to the left wall 52 of the left burner pan 20, a short leg 54 and long leg 55 substantially perpendicular to the body portion 53 so that the open portion of the C-shape faces the air intake grating 13 of the exhaust enclosure 12. The front and rear C-shaped burners 50 and 51 are individually controlled as will be further discussed herein.

As best shown in cross section in FIG. 10, each of the C-shaped gas burners 50 or 51 have upper and lower formed sheet metal shells or halves 56 and 59. In the preferred embodiment, the C-shaped gas burners 50 and 51 are formed from stainless steel. As further shown in FIG. 10, the upper sheet metal shell or half 56 is formed in a tent or inverted V-shape to promote the drainage of grease and drippings as meat products are grilled. When viewing the cross section of FIG. 10, the tent-shaped upper sheet metal shell or half 56 includes a generally vertical downwardly extending lower wall portion or flange 60 which extends around the periphery of the C-shaped gas burners 50 or 51 as viewed in FIG. 9. The lower sheet metal shell or half 59 is substantially U-shaped in cross section and, as shown in FIG. 10, includes a generally vertical upwardly extending upper wall portion or flange 61 which extends around the periphery of the C-shaped gas burners 50 or 51 and which nests inside of the vertical lower wall portion or flange 60 of the upper sheet metal shell or half 56. The side walls 62 of the lower sheet metal shell or half 59 are inclined at approximately 30° to vertical and the gas ports 63 which are spaced around the periphery of the gas burners 50 and 51 are clean cut holes generally free from burrs and formed substantially perpendicular to these side walls 62.

Referring now to FIG. 9 in particular, progressing around the periphery of the front burner 50 of the grill burner unit 46 and beginning at point A which is the location of the ignition charge port 66 best shown in FIG. 7. In the preferred embodiment, from point A to point B there are 14 gas ports 63 spaced at 0.137 inches apart. From point B to point C there are 14 gas ports 63 spaced at 0.157 inches apart. From point C to point D there are 4 gas ports 63 spaced at 0.233 inches apart. Between points D and E there are 19 gas ports 63 spaced at 0.174 inches apart. From point E to point F there are 4 gas ports 63 spaced 0.233 inches apart. Between points F and G there are 27 gas ports 63 spaced at 0.171 inches apart. Between points G and H there are 13 gas ports 63 spaced 0.137 inches apart. From point H to point J there are 19 gas ports 63 spaced at 0.133 inches apart. All of the gas ports 63 between points A and J are 0.055 inches in diameter.

Continuing around the periphery of the front burner 50, between points J and K, there are 11 gas ports 63 spaced at 0.205 inches apart. Between points K and L there are 19 gas ports 63 spaced at 0.154 inches apart. From points L to M there are 17 gas ports 63 spaced at 0.195 inches apart and between points M and N there are 11 gas ports 63 spaced at 0.154 inches apart. All gas ports 63 between points J and N are 0.070 inches in diameter. There are no gas ports 63 between points N and A. The same pattern of gas ports 63 are formed around the periphery of the rear burner 51. The sizing of the gas ports 63 provides for increased heat output between points J and N as compared to the inside areas between ports A and J of the burner 50 including the inside radii and the ends of the burner 50. Also, there is no heat output between points A and N. Thus, relatively more heat is output adjacent the left side wall 52, the rear wall 57 and the front wall 123 of the burner pan 20.

When the upper and lower sheet metal halves 56 and 59 are assembled by a process such as silver soldering, oven brazing, or other equivalent method, a C-shaped gas burner 50 or 51 will be formed which is completely devoid of any upwardly facing horizontal plane surfaces and thus will not present any areas for drippings to collect and cause flare-ups. In addition, the gas ports 63 of the C-shaped gas burners 50 and 51 are located below the widest portion of the C-shaped gas burner 50 or 51 and will thus also be protected from grease drippings from above. Further protection from grease contamination of the grill burner unit 46 is provided by its physical location generally closer to the left side wall 52 of the left burner pan 20. In this offset posture, virtually all food loads cooked will be generally centered above the open portions of the C-shaped gas burners 50 and 51. This positioning will allow the vast majority of drippings to fall directly into the burner pan 20 and drain into the jar 34.

As further shown in FIGS. 6 and 7, the short leg 54 of each C-shaped gas burner 50 or 51 is located adjacent the centrally mounted spark igniter 43. As shown in FIG. 7, the lower sheet metal shell or half 59 of each C-shaped gas burner 50 or 51 includes a generally vertical wall segment 64 juxtaposed to the spark igniter 43. The vertical wall segment 64 includes a substantially horizontally directed charge port 66 which directs a combustible mixture of gas and air into one of the apertures 65 of spark igniter 43 to individually ignite C-shaped gas burner 50 or 51.

As best shown in FIG. 9, the front and rear C-shaped gas burners 50 and 51 are rigidly secured to bracketry including first and second bracket portions 69 and 75 which are utilized in mounting the grill burner unit 46 within the left burner pan 20. The first bracket portion 69 includes an elongated inverted L-shaped section 70 which extends generally horizontally along the body portions 53 and is welded or otherwise secured to the bottom of each C-shaped gas burner 50 or 51. The downwardly extending vertical leg of the inverted L-shaped section 70 defines a baffle or deflector 68 which extends parallel to the body portions 53 of the burners 50 and 51. The first bracket portion 69 further includes an arm 71 formed from inverted V-shaped channel stock for promoting grease drainage. This arm 71 is joined to and extends outwardly in a substantially perpendicular direction from the inverted L-shaped section 70. The arm 71 has a downwardly turned mounting tab 72 which includes a downwardly opening slot (not shown) for receiving a mounting stud 74 attached to the left or outside wall 52 of the left burner pan 20.

As further shown in FIG. 9, the second bracket portion 75 is likewise secured to the bottom of the long leg 55 of the rear C-shaped gas burner 51 and includes an arm 73 also formed from inverted V-shaped channel stock for promoting grease drainage. The arm 73 is substantially parallel with the arm 71 of the first bracket portion 69. The second bracket portion 75 extends outwardly from the long leg 55 of the rear C-shaped gas burner 51 and, as best shown in FIG. 6, has a downwardly turned mounting tab 76 with a downwardly opening slot 79 for receiving a mounting stud 80 attached to the right side wall 81 of the left burner pan 20. The rearwardly offset positioning of the right mounting stud 80 and second bracket portion 75 enhances the stability of the grill burner unit 46 when mounted within the left burner pan 20.

Each of the C-shaped gas burners 50 and 51 include a gas mixer tube 82 or 83 for conducting gas and air from the hood 84 of the gas inlets 85 to within the C-shaped gas burners 50 or 51. The gas inlets 85, as best shown in FIGS. 12 and 13, are secured to the front wall 123 of the left burner pan 20 and to the front wall 127 of the right burner pan 21. The gas inlets 85 provide a right angle connection into the burner pans 20 and 21 and include orifice hoods 84 which have orifices that are sized to provide the desired flow rate of gas. Each mixer tube 82 or 83 has a mixer head 86 with an adjustable air shutter 89 for individually adjusting the gas-air mixture provided to the individual C-shaped gas burners 50 or 51. During operation, each C-shaped gas burner 50 or 51 will have an output of 8000 British thermal units per hour for either natural gas or liquified petroleum gas.

The mixer tubes 82 or 83 are secured to the lower sheet metal half 59 of the C-shaped gas burners 50 or 51 as best shown in the exploded view of FIG. 14. As depicted in FIG. 14, each mixer tube 82 or 83 has an attachment flange 90 welded to the outlet end thereof. A generally circular metallic gasket 91 preferably fabricated from a brass or bronze alloy is placed between the attachment flange 90 and the lower sheet metal half 59 of the C-shaped gas burners 50 or 51. This metallic gasket 91 has an extruded central portion 92 which extends downwardly into the junction between the attachment flange 91 and mixer tube 82 or 83. When the pair of self-tapping threaded fasteners 93 are tapped into the pair of extruded holes 94 formed in the lower sheet metal half 59, the burner end of the mixer tube 82 or 83 extends into the C-shaped gas burner 50 or 51 and the gasket 91 contacts the lower sheet metal half 59 to form a substantially gas tight seal. The metallic gasket 91 assures that the joint between the lower sheet metal half 59 and the attachment flange 90 will be moisture and grease resistant and allows the grill burner unit 46 to be cleaned in an automatic dishwasher or in a self-cleaning oven.

As discussed herein and as best shown in FIGS. 1, 6 and 9, a three point mounting method is utilized for the grill burner unit 46 with the air shutters 89 of the mixer heads 86 telescoping over the orifice hoods 84 of the gas inlets 85 and the downwardly opening slots associated with the mounting tabs 72 and 76 engaging the mounting studs 74 and 80 on the side walls 52 and 81 of the left burner pan 20. When the grill burner 46 is mounted in the left burner pan 20 as shown in FIGS. 1 and 6, the main body portions 53 of the gas burners 50 and 51 are juxtaposed to the left side wall 52 of the left burner pan 20. As will be discussed further herein, the exhaust blower 14 is operated whenever the grill burner unit 46 is in use so that heated air is continually drawn generally across and upwardly away from the grill burner unit 46 and eventually down into the exhaust enclosure 12. The physical location of the C-shaped gas burners 50 or 51 within the left burner pan 20 away from the enclosure 12 provides for controlled convective heating across the entire width of the left burner pan 20 and the grill grates 96 or 97 for preventing cold and hot spots. Due to the action of the exhaust blower 14 in drawing heated air across the left burner pan 20, it is found that little or no flame is required in the area directly adjacent the air intake grating 13 and thus, as previously discussed, the gas ports 63 have been arranged to provide relatively more heat output adjacent the left side wall 52, the rear wall 57 and the front wall 123 of the left burner pan 20.

As also previously discussed, each non-removable burner pan 20 or 21 has a generally centrally located spark igniter 43 which is attached thereto and operable with either the grill burner unit 46 or the surface burner unit 49. The short leg 54 of each C-shaped gas burner 50 or 51 of the grill burner unit 46 extends the peripheral row of gas ports 63 to this centrally located spark igniter 43. The short legs 54 of the C-shaped gas burners 50 or 51 provide for automatic ignition of the C-shaped gas burners 50 or 51 and for efficient flame transfer to the gas ports 63 without adversely affecting heat distribution.

As best shown in FIGS. 1 and 3, the framelike cover 19 supports a pair of grill grates 96, which are fabricated from rod stock, over the grill burner unit 46. In order to meet testing agency requirements the gas downdraft countertop cooking unit 10 must be able to continually draw air into the burner pan 20 even if the grill grates 96 are completely covered as with a flat cookie sheet or griddle, for example. As shown in FIGS. 1 and 3, by the triple dot-solid line arrows 104, combustion air will be drawn into the burner pan 20 along the edges of the grill grates 96 which are elevated with respect to the cover 19.

FIG. 16 depicts the preferred grill grate embodiment incorporating cast aluminum grill grates 97. The cast aluminum grill grates 97 have openings 98 on each side of the burner pan 20 which are sized to provide about 6.5 square inches of intake area and allow a controlled optimum volume of air to be drawn into the left side of the burner pan 20. The openings 98 extend from front to rear and generally parallel with the air intake grating 13. Combustion air depicted by the triple dot-solid line arrows 104 enters the burner pan 20 through the opening 98 on the left side as shown in FIG. 16. The baffle or deflector 68 retards airflow adjacent the side wall 52 to achieve improved flame characteristics adjacent the baffle 68 for retaining maximum heat in the vicinity of the main body portions 53 of the burners 50 and 51. In other words, the baffle or deflector 68 prevents the flame from being pulled under the burners 50 and 51 by the velocity of combustion air 104 pulled into the burner pan 20 through openings 98. This permits convective heat thermals to rise in a substantially vertical path in the area superjacent the burners 50 and 51. As further shown in FIG. 16, the cast aluminum grates 97 further include front-to-rear extending upwardly projecting ribs 87 and 88. As air is drawn from the surface of the grates 97, the left rib 87 will initially retard and deflect the air in an upward direction to enhance the convective airflow above the grill burner unit 46.

It is further contemplated that, in another embodiment of the grates 97, the openings 98 adjacent the air intake grating 13 could be closed and air could be directly withdrawn from the burner pan 20 through the openings between the grate fingers 99. In this embodiment, the right rib 88 would not extend full length from front-to-rear of the grates 97 but would be periodically interrupted to provide airflow passages.

It has been found that these cast aluminum grates 97 provide somewhat improved convective heat distribution as compared to the grill grates 96. The relatively thick section or depth of the horizontal grill grate fingers 99 of the grill grates 97 slow the rate of vertical airflow from the burner pan 20 and retard the velocity of air pulled from the surface of the grill grates 97 toward the air inlet 13. In addition, the arrangement of the openings 98 and the baffle or deflector 68 associated with the grill burner unit 46 combine to provide heating at the left side of the burner pan 20. It has been found that with this arrangement, fast, uniform convective cooking can be achieved by using less than maximum burner settings.

In the present embodiment of the invention, the left burner pan 20 is configured so as to be selectively convertible between the grill burner unit 46 shown in FIGS. 1 and 6 and a surface burner unit 49 shown in FIGS. 1 and 8.

Referring now to FIGS. 1, 3, 8 and 11, the right side of the gas downdraft countertop cooking unit 10 is shown as including a surface burner unit 49 having an aeration pan 100 overlying a pair of gas surface burners 101 and 102 and longitudinally coextensive with the air intake grating 13. The aeration pan 100 provides support for a pair of cooking grates 103 on which various cooking pots or pans are placed during cooking. In a gas downdraft countertop cooking unit 10 as described herein, it is imperative that the exhaust blower 14 be allowed to induce the flow of combustion air into the burner pans 20 and 21 as indicated by the triple dot-solid line arrows 104 for but not be allowed to pull excessive quantities of this fresh combustion air out of the burner pan 20 or 21 occupied by the surface burner unit 49. Therefore, in the instant invention, the aeration pan 100 for the surface burner unit 49 is formed with a downturned lip 105 juxtaposed to and substantially parallel to the air intake grating 13 of the exhaust plenum chamber 12 as best shown in FIG. 3. This downturned lip 105 forms a substantially metal-to-metal contact seal with the top surface of the cover 19 to throttle the effect of the exhaust blower 14 for substantially preventing combustion air from being directly removed from the right burner pan 21 by the exhaust blower 14. The downturned lip 105 substantially limits air removal from the right burner pan 21 to the air drawn through the clearance apertures 106 for the burners 101 and 102. In one embodiment of the invention, the downturned lip 105 is 3/16 of an inch high. The front, rear and the side opposite the downturned lip 105 of the aeration pan 100 are spaced 3/16 of an inch above the cover 19 by spacer blocks (not shown) so that a nominal 3/16 inch airflow space or gap 109 is formed between the cover 19 and the aeration pan 100 for introducing combustion air to within the right burner pan 21 utilizing the pair of gas surface burners 101 and 102. It is contemplated that this nominal airflow gap 109 may vary in height between about ⅛ and 5/16 of an inch and that the airflow gap 109 does not necessarily need to encompass each of the three remaining sides of the aeration pan 100 but could include one of or any combination of these sides.

Each of the surface burners 101 or 102 include a gas mixer tube 107 or 108 for conducting gas and air from the orifice hood 84 of the gas inlets 85 to within the surface burners 101 or 102. Each mixer tube 107 or 108 has a mixer head 117 with an adjustable air shutter 118 for individually adjusting the gas-air mixture to the individual burners 101 or 102.

As best shown in FIGS. 8 and 11, the pair of gas surface burners 101 and 102 are attached to legs 95 which are secured to a substantially rectangular mounting bracket 110 by a plurality of threaded fasteners 111. As further shown in FIG. 11, the mounting bracket 110 includes an aperture 112 for clearing the body of the centrally mounted spark igniter 43. Attached to brackets 113, which are shown only in FIG. 8, are ignition flash tubes 114 which carry a portion of the combustible gas-air mixture from the surface burner 101 or 102 to the aperture 65 of the spark igniter 43. When ignition occurs, the flash tubes 114 return the resultant flame to the surface burner 101 or 102 for ignition of gas therein. In operation, each of the surface burners 101 or 102 will have an output of 10,000 British thermal units per hour for natural gas and 9000 British thermal units per hour for liquified petroleum gas. The actual flow rate of gas to the surface burner unit 49 and to the grill burner unit 46 is determined by the diameter of the orifice drilled in the orifice hoods 84.

The rectangular mounting bracket 110 further includes, as shown in FIG. 8, a downwardly turned mounting tab 115 at each side. These mounting tabs 115 each have a pair of downwardly opening slots 116 for receiving mounting studs 119 located in each side wall of the right burner pan 21. The surface burner unit 49 is mounted in a manner similar to the grill burner unit 46 with the air shutters 118 of the mixer heads 117 telescoping over the orifice hoods 84 of the gas inlets 85 and the forward pair of downwardly opening slots 116 of the mounting bracket 110 engaging the mounting studs 119 attached to the side walls of the right burner pan 21. The rear slots 116 are used when the surface burner unit 49 is mounted in the left burner pan 20. This provides a further deterrent to mounting a grill burner unit 46 in the right burner pan 21 since the grill burner unit 46 would not be provided with brackets usable with the mounting studs in burner pan 21.

Due to the necessity of always having the downwardly turned lip 105 of the aeration pan 100 juxtaposed to the air intake grating 13, a locating pin 121, shown in FIG. 8, is attached to the underside of the aeration pan 100. The locating pin 121 is positioned slightly off-center with respect to the front-to-rear center line of the aeration pan 100. When the aeration pan 100 is used in the right burner pan 21 the locating pin 121 will extend through an aperture 137 located in the rear wall 122 of the right burner pan 21 as shown in FIGS. 8 and 12. This will ensure that the downwardly turned lip 105 is always juxtaposed to the air intake grating 13 since the locating pin 121 precludes assembly of the aeration pan 100 to the right burner pan 21 in any other orientation. When the left burner pan 20 is to be converted from a grill burner unit 46 to a surface burner unit 49, the aeration pan 100 must be rotated 180° about a vertical axis or front-to-rear as compared to the right side posture. After this rotation, the locating pin 121 will extend forwardly through an off-center aperture 128 located in the front wall 123 of the left burner pan 21, as shown in FIGS. 12 and 15. Again, this is the only possible orientation of the aeration pan 100 in the burner pan 20 and will ensure that the downwardly turned lip 105 is always juxtaposed to the air intake grating 13.

In the drawing figures various coded arrows have been utilized to depict specific airflow paths induced by the exhaust blower 14 when it is in operation. As best shown in FIG. 3, when the exhaust blower 14 is in operation a high volume rate of air generally indicated by the double dash-solid line arrow 124 is continually drawn through the air intake grating 13 and into the exhaust enclosure 12. This creates a region of negative air pressure immediately above the air intake grating 13 which extends outwardly over both burner pans 20 and 21. Exhaust air including any products of combustion and/or cooking vapors is gathered above the downdraft countertop cooking unit 10 and is drawn into the exhaust enclosure 12.

A triple dot-solid line arrow 104, shown in FIGS. 1, 3, 6, 8 and 16, is indicative of combustion air entering the left and right burner pans 20 and 21 at a location which is remote from the exhaust enclosure 12. The combustion air passes freely into the burner pans 20 and 21 without being adversely affected by the relatively high velocity and volume rate of air indicated by the double dash-solid line arrow 124.

Referring again to FIGS. 1, 3, 6 and 8, a dashed line arrow 125 is indicative of cooling airflow which is drawn into the airflow channels 40 between the burner boxes 11 and 28 and the burner pans 20 and 21 through the first plurality of louvers 35 for cooling the walls of the burner pans 20 and 21 without affecting the flow of combustion air into the burner pans 20 and 21. This cooling airflow enters the exhaust enclosure 12 through the second plurality of louvers 39 in the exhaust enclosure 12 as shown in FIG. 3. The solid line arrows 126 shown within the exhaust enclosure 12 in FIG. 3 which proceed past the filter element 129 indicate a combined airflow as the plurality of airflow paths are combined and are exhausted to atmosphere. When the exhaust blower 14 is actuated the exhaust air indicated by the double dash-solid line arrows 124 shown as a cloud-like form in FIG. 3 and consisting mainly of combustion products and odoriferous cooking vapors will be drawn substantially horizontally across the top surface of the downdraft countertop cooking unit 10 and into the exhaust enclosure 12. As shown by the triple dot-solid line arrows 104 the exhaust blower 14 will also cause combustion air to be drawn into the right burner pan 21 through the air gap 109 and into the left burner pan 20 along the edges of the grill grates 96 which are elevated with respect to the cover 19 or through openings 98 in grill grates 97 when configured as a surface burner unit 49 and grill burner unit 46 respectively. Also, cooling airflow indicated by the dashed arrows 125 will enter the airflow channels 40 through the louvers 35 defining the air inlets and will move through the airflow channel 40 and into the exhaust enclosure 12 through louvers 39.

There thus have been provided three separate and generally distinct airflow paths; one for exhaust airflow which removes cooking vapors, products of combustion and heated excess air, another for combustion airflow to the grill burner unit 46 and the surface burner unit 49 mounted within the burner pans 20 and 21 and a third for cooling airflow below the left and right burner pans 20 and 21. The combustion airflow is converted to exhaust airflow prior to entering the exhaust enclosure 12. The combined combustion airflow and exhaust airflow merge with the cooling airflow within the exhaust enclosure 12 where they are filtered and finally exhausted to atmosphere. The exhaust blower 14 is operable for inducing each of these separate airflows but none of the airflows will overcome the effect of any of the others.

In yet another embodiment, shown in the fragmentary section view of FIG. 17, the access cover 48, of FIG. 6, is removed from over the access opening 47 in the burner box 11. A pan-shaped baffle plate 155 is spaced below the bottom wall 18 by side walls 156 and is secured thereto with sheet metal screws. The front wall 159 of the baffle plate 155 is shortened as compared to the side walls 156 to provide an airflow passage 160 between the bottom wall 18 and the baffle plate 155. This embodiment thus provides a supplemental cooling path for the burner box 11. Cooling airflow indicated by the dashed arrows 125 enters the airflow passage 160, washes the bottom wall 18 and moves through the access opening 47 into the airflow channel 40. The cooling airflow finally enters the exhaust enclosure 12 through the louvers 39.

Turning now to FIGS. 1, 6, 8, 12 and 13 in particular, there is shown the gas distribution system for the gas downdraft countertop cooking unit 10 of the preferred embodiment of the instant invention. As shown in FIG. 1, the front center of the countertop cooking unit includes a control console having an escutcheon panel 130 locating four control knobs 131. The two knobs 131 on the left are manually rotatable for controlling the operation of a pair of gas valves each of which is designated by numeral 132 which independently control the gas supply to the two portions 50, 51 of the grill burner unit 46. The two knobs 131 on the right control operation of a pair of gas valves each of which are designated by numeral 133 which independently control individual burners of the surface burner unit 49. The left-located valves 132 and right-located valves 133 are best shown in FIGS. 12 and 13. As further indicated in FIGS. 1, 12 and 13, the gas valves 132 and 133 and control knobs 131 are mounted in a closely spaced substantially square pattern or cluster. As indicated in FIGS. 12 and 13, the construction of the cooking unit 10 with the non-removable left and right burner pans 20 and 21 located on either side of the exhaust enclosure 12 and the space requirements of these components leaves only a confined generally rectangular and vertically extending space directly in front of the exhaust enclosure 12 and between the burner pans 20 and 21 for placement of the gas regulator 134, gas manifold 135, gas valves 132 and 133 and gas distribution lines 136. The placement of components within the confined mounting space permits the construction of a thirty inch wide cooktop or range. If, for example, the components were placed along an edge, a substantially greater surface area would be required. It has previously been generally accepted industry practice to fabricate a gas manifold from gas pipe or other conduit and simply mount the gas valves directly to the conduit. In the previous constructions the gas manifold would extend linearly across the front edge or along a side of the range and the gas valve stems would generally line up with the shape of the conduit and extend through the top of the range toward the appliance operator. In the present construction, however, the use of the prior art systems is precluded by the severe space limitations imposed by the location of the burner pans 20 and 21 and the exhaust enclosure 12 while maintaining a thirty inch wide construction. Also, the utilization of a substantially square mounting pattern or cluster as shown in FIGS. 1 and 13 allows for commonality of the escutcheon panel 130 and similar styling features with thirty inch wide electric downdraft countertop cooking units.

As shown in FIGS. 12 and 13, a compact, generally cylindrical gas manifold 135 measuring about 4¾ inches in diameter is attached to a bracket 139 which in turn is attached to the substantially horizontal bottom wall 18 of the housing 17. The gas manifold 135 is located forwardly of the exhaust enclosure 12 and behind the front wall 24 of the housing 17. As further shown in FIG. 12, the gas pressure regulator 134 is located between the bottom of the gas manifold 135 and the gas supply line 141. In this embodiment, the gas pressure regulator 134 will automatically regulate natural gas at 5 inches water column pressure and liquified petroleum gas at 10 inches water column pressure after being converted for the respective gas.

The pair of manually operated left-located gas valves 132 and pair of right-located gas valves 133 are attached to the top of the gas manifold 135 in the previously described substantially square mounting pattern or cluster as shown in FIGS. 12 and 13. These four gas valves control the individual supply of gas to the two portions of the grill burner unit 46 and to the individual burners of the surface burner unit 49 via gas distribution lines 136 which extend from the four gas valves to the four right angle gas inlets 85 mounted two each in the front walls 123 and 127 of the non-removable left and right burner pans 20 and 21. As best illustrated in FIG. 13, the gas distribution lines 136 are routed between the front wall 24 of the housing 17 and the non-removable left and right burner pans 20 and 21.

Space limitations for routing the gas distribution lines 136 in opposite directions from the gas manifold 135 necessitate that the four gas valves be mounted to the gas manifold 135 with the gas outlets 144 of the left-located gas valves 132 oriented at a 45° angle toward the burner pan 20 and with the gas outlets 144 of the right-located gas valves 133 at a 45° angle toward the burner pan 21 as shown in FIG. 13. Except for the relative angular displacement of the outlets, the two left-located and two right-located gas valves 132 and 133 including rotation of the valve stems 146 and of the knobs 131 and the placement of flats 145 on the shafts 146 are the same. This will allow the control knobs 131 to be identical since all operations will start from the same "off" position.

Figure 2:
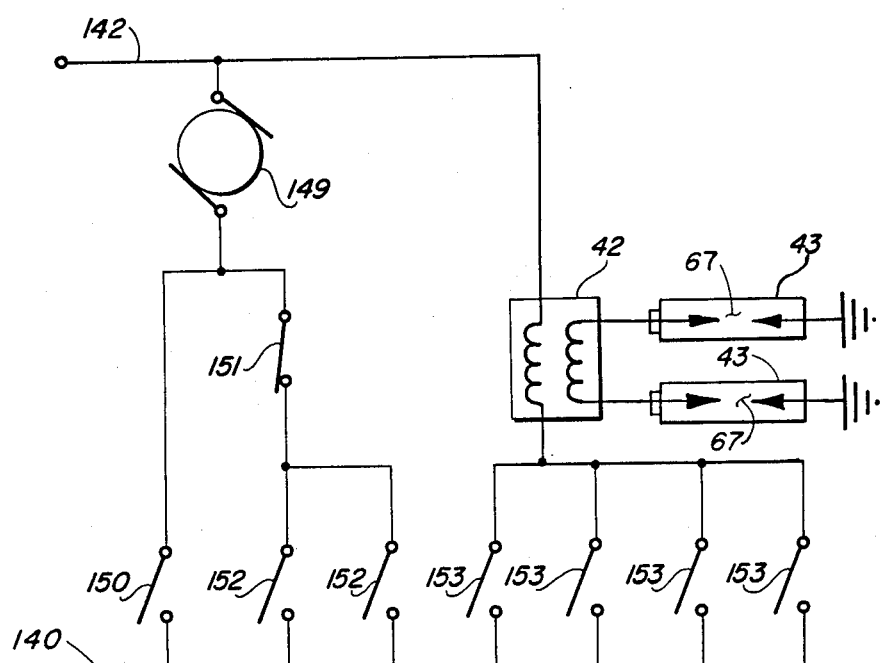
FIG. 2 is an electrical schematic circuit for the gas downdraft countertop cooking unit of FIG. 1.

Turning now to FIG. 2, there is shown an electrical schematic circuit for the gas downdraft countertop cooking unit 10 of the instant invention. Standard 120 VAC household power is supplied across power lines 140 (line) and 142 (Neutral). In a first portion of the circuit an exhaust blower motor 149 of the exhaust blower 14 is connected across the power lines 140 and 142 in series with a manually actuatable blower control switch 150 which is also shown on the escutcheon panel 130 in FIG. 1. The exhaust blower motor 149 is also connected in series with a normally closed blower motor switch 151 mounted on the front wall 123 of the left burner pan 20 as shown in FIGS. 12, 13 and 15 and one of a pair of normally open motor switches 152 which are electrically rated to carry the current requirements of the exhaust blower motor 149. Motor switches 152 are mounted directly on the stems 146 of the left-located pair of gas valves 132 serving the left burner pan 20.

As indicated in FIGS. 6, 8 and 13, the front wall 24 of the housing 17 includes a rectangular opening 161 for providing access to the gas inlets 85, the blower motor switch 151 and at least a portion of the gas manifold 135. The rectangular opening 161 is normally closed by a sheet metal cover 162 secured to the wall 24 by sheet metal screws. The left side of the cover 162 directly in front of the blower motor switch 151 is perforate (not shown) and provides for additional cooling air to enter the burner box 11 in the vicinity of the blower motor switch 151.

In a second portion of the circuit shown in FIG. 2, a spark module 42 is connected across the power lines 140 and 142 in series circuit connection with four parallel, normally open, ignition switches 153 that are mounted one on each of the valve stems 146 of the four gas valves indicated by numerals 132 and 133 as best illustrated in FIGS. 12 and 13 so that the left-located gas valves 132 will each mount a motor switch 152 and an ignition switch 153. The ignition switches 153 are operable to a closed condition for energizing the spark module 42 and the spark igniters 43 as any one of the control knobs 131 is manually rotated to provide a gas-air mixture to a selected burner.

The motor and ignition switches 152 and 153 mounted on the valve stems 146 of the manually operated gas valves 132 and 133 are indexed or secured so that the body portions of each will not rotate with the valve stem 146 but will be actuated as the valve stems 146 are rotated by the control knobs 131. The normally open ignition switches 153 are designed so that the contacts are actuated to complete a circuit to the spark module 42 only during the last 5°–10° of rotation of the valve stem 146 corresponding to the burner "ignite" position. Once ignition is achieved the control knob 131 must be manually rotated back to a cook position. It is noted that the valve stems 146 could be spring biased so that once ignition is achieved the control knob 131 would be automatically rotated back to a cook position. The normally open motor switches 152 are designed so that their contacts will be closed throughout the rotation of the valve stem 146.

When an ignition switch 153 is actuated by rotation of any valve stem 146 a circuit is completed to the spark module 42 and to both spark igniters 43. If, for example, one of the gas valve pair 133 is operated, the spark igniters 43 in both the left and right burner pans 20 and 21 will be simultaneously energized and that burner which is receiving gas will be ignited. As previously discussed, each of the spark igniters 43 includes a conductive outer casing which is grounded to the left or right burner pan 20 or 21. As best shown in FIGS. 6, 7 and 8, each spark igniter 43 casing also includes an aperture 65 for receiving fuel to be ignited. When energized, the spark igniters 43 cause a high voltage, low amperage spark to be discharged from an internal electrode (not shown) across a spark gap 67, shown schematically in FIG. 2, to the conductive outer casing to ground. Depending upon whether a gas valve 132 or 133 is operated, a gas-air mixture from the grill burner unit 46 or surface burner unit 49 will be ignited by the spark across the spark gap 67.

The preferred embodiment of the instant invention utilizes the pair of normally open motor switches 152 mounted on the valve stems 146 of gas valves 132 in addition to the normally closed blower motor switch 151 mounted to the front wall 123 of the left burner pan 20, as shown in FIGS. 12 and 13, to provide for automatic operation of the exhaust blower motor 149 whenever the grill burner unit 46 is in use. Whenever a gas valve 132 is operated the corresponding motor switch 152 mounted on the valve stem 146 will be closed in series circuit connection with the normally closed blower motor switch 151 to automatically energize the exhaust blower motor 149. Between approximately 160° and 170° of rotation the corresponding normally open ignition switch 153 will be closed to energize the circuit to the spark module 42 and the spark igniters 43. The exhaust blower motor 149 will also be automatically shut off when the gas supply to the grill burner unit 46 is shut off by manual rotation of the proper knob 131. Since the grill burner unit 46 is served by two gas valves 132 similar switching will occur at both gas valves 132 to assure automatic operation of the exhaust blower motor 149 with the operation of either gas valve 132 and either of the C-shaped burners 50 and 51. It is noted that it has previously been common industry practice to utilize various cam devices located on the gas valve stems to move arms and levers to actuate a switch arm for energizing a blower motor. Space limitations and the absence of convenient mounting surfaces precludes such an arrangement herein resulting in the unique arrangement of motor and ignition switches 152 and 153 mounted on the valve stems 146 of gas valves 132 for both automatic control of the exhaust blower motor 149 as well as control of gas ignition through the spark igniters 43.

In an alternate embodiment, the motor switch 152 could be connected in series with a relay (not shown) having load contacts in series connection with the exhaust blower motor 149.

When the left burner pan 20 is to be converted from a grill burner unit 46 to a surface burner unit 49 similar to that shown on the right side, automatic operation of the exhaust blower 14 is not required. After a pair of gas surface burners 101 and 102 are inserted into the left burner pan 20, the aeration pan 100 is installed therein with the locating pin 121 extending through the aperture 128 in the front wall 123 of the left burner pan 21 and engaging the actuating lever 154 of the normally closed switch 151 as shown in FIG. 15 to effect the opening of that switch 151. Opening the normally closed blower motor switch 151 will effectively sense the absence of the grill burner unit 46 and remove the motor switches 152 from the circuit to the motor 149 as the valve stems 146 of gas valves 132 are rotated. Thus, with a pair of surface burner units 49 in the left burner pan 20 the exhaust blower motor 149 will be actuated only through the manually actuatable switch 150 as desired by the appliance operator.

The description has defined an improved gas burner construction having a generally hollow horizontally elongated burner body. The burner body includes an upper body portion with a downwardly extending first peripheral flange and an imperforate top wall extending inwardly and upwardly from the first peripheral flange. All plane surfaces of the first peripheral flange and the top wall are disposed only in vertical and angular planes to define an upper body portion free of upwardly facing horizontal plane surfaces. The lower body portion includes an upwardly extending second peripheral flange mating with the downwardly extending first peripheral flange and a bottom wall extending inwardly and downwardly from the second peripheral flange. The downwardly extending first peripheral flange overlaps and is continuously connected to the upwardly extending second peripheral flange to form a burner body completely free of upwardly facing horizontal plane surfaces on which drippings may collect and cause flare-ups. Gas ports are formed in the bottom wall and are spaced about the periphery of the burner body under the widest portion thereof to prevent contamination from above.

In the drawings and specification, there has been set forth a preferred embodiment of the invention and although specific terms are employed these are used in a generic and descriptive sense only and not for purposes of limitation. Changes in the form and the proportion of parts as well as the substitution of equivalents are contemplated as circumstances may suggest or render expendient without departing from the spirit or scope of the invention as defined in the following claims.

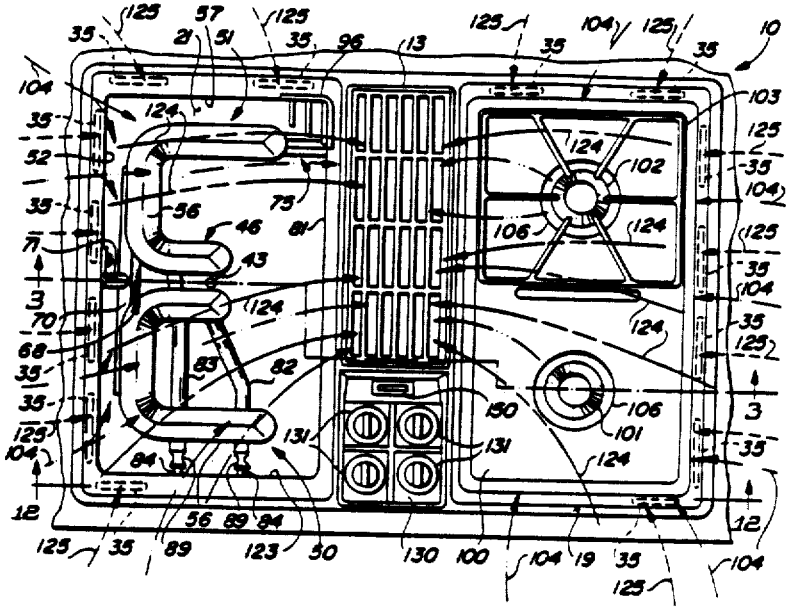

I claim:

1. A gas burner for cooking food with an open flame, comprising: means defining a generally hollow horizontally elongated burner body including an upper body portion and a lower body portion, said upper body portion having a generally downwardly extending first peripheral flange and imperforate top wall means extending inwardly and upwardly from said first peripheral flange with all plane surfaces of said first peripheral flange and said top wall means being disposed only in vertical and angular planes to define an upper body portion free of upwardly facing horizontal plane surfaces, said lower body portion having a second peripheral flange mating with said first peripheral flange and further having bottom wall means extending inwardly and downwardly from said second peripheral flange, said first peripheral flange overlapping and continuously connected with said second peripheral flange to form a burner body completely free of upwardly facing horizontal plane surfaces on which drippings may collect and cause flare-ups; a plurality of gas ports formed in said bottom wall means of said lower body portion and spaced about the periphery thereof, said gas ports located beneath the widest portion of said burner body for preventing contamination from above; and means for supplying said burner body with a combustible mixture of gas and air.

2. A gas burner as defined in claim 1 wherein the center lines of said gas ports are normal to the port-defining portions of said bottom wall means and are directed angularly downward to guard against contamination from above.

3. A gas burner as defined in claim 1 wherein said upper body portion is substantially tent-shaped in cross-section.

4. A gas burner as defined in claim 1 wherein said upper and lower body portions are formed from sheet metal and welded along said overlapping first and second peripheral flanges to form a unitary member.

5. A gas burner for cooking food with an open flame, comprising: means defining a generally hollow horizontally elongated burner body including an upper body portion and a lower body portion, said upper body portion having a downwardly extending first peripheral flange and imperforate top wall means extending inwardly and upwardly from said first peripheral flange with all plane surfaces of said first peripheral flange and said top wall means being disposed only in vertical and angular planes to define an upper body portion free of upwardly facing horizontal plane surfaces, said lower body portion having an upwardly extending second peripheral flange mating with said downwardly extending first peripheral flange and further having bottom wall means extending inwardly and downwardly from said second peripheral flange, said downwardly extending first peripheral flange overlapping and continuously connected with said upwardly extending second peripheral flange to form a burner body completely free of upwardly facing horizontal plane surfaces on which drippings may collect and cause flare-ups; a plurality of gas ports formed in said bottom wall means of said lower body portion and spaced about the periphery thereof, said gas ports located beneath the widest portion of said burner body for preventing contamination from above; bracket means having an inverted V-shape cross section free of upwardly facing horizontal plane surfaces for mounting said burner body in an operable posture; and means for supplying said burner body with a combustible mixture of gas and air.

6. A gas burner as defined in claim 5 wherein said bottom wall means includes a vertically disposed wall portion having means defining a substantially horizontally directed ignition charge port.

7. A gas burner for cooking food with an open flame, comprising: means defining a generally hollow horizontally elongated burner body, said burner body in plan view being non-linear and having portions unsymmetrically offset from the primary axis thereof whereby food items being cooked are laterally offset relative to said burner body portions for minimizing the drippings thereonto, said burner body in cross section including an upper body portion and a lower body portion, said upper body portion having a downwardly extending first peripheral flange and imperforate top wall means extending inwardly and upwardly from said first peripheral flange with all plane surfaces of said first peripheral flange and said top wall means being disposed only in vertical and angular planes to define an upper body portion free of upwardly facing horizontal plane surfaces, said lower body portion having an upwardly extending second peripheral flange mating with said downwardly extending first peripheral flange and further having bottom wall means extending inwardly and downwardly from said second peripheral flange, said downwardly extending first peripheral flange overlapping and continuously connected with said upwardly extending second peripheral flange to form a burner body completely free of upwardly facing horizontal plane surfaces on which drippings may collect and cause flare-ups; a plurality of gas ports formed in said bottom wall means of said lower body portion and spaced about the periphery thereof, said gas ports located beneath the widest portion of said burner body for preventing contamination from above; and means for supplying said burner body with a combustible mixture of gas and air.

* * * * *

UNITED STATES PATENT AND TRADEMARK OFFICE
CERTIFICATE OF CORRECTION

PATENT NO. : 4,705,021

DATED : November 10, 1987

INVENTOR(S) : Stanley H. Beach

It is certified that error appears in the above-identified patent and that said Letters Patent is hereby corrected as shown below:

The title page should be deleted to appear as per attached title page.

Signed and Sealed this

Twenty-third Day of February, 1988

Attest:

DONALD J. QUIGG

*Attesting Officer*         *Commissioner of Patents and Trademarks*

United States Patent [19]

Beach

[11] Patent Number: 4,705,021

[45] Date of Patent: Nov. 10, 1987

[54] GAS BURNER CONSTRUCTION

[75] Inventor: Stanley H. Beach, Indianapolis, Ind.

[73] Assignee: The Maytag Company, Newton, Iowa

[21] Appl. No.: 22,366

[22] Filed: Mar. 5, 1987

[51] Int. Cl.⁴ .............................................. A47J 37/00
[52] U.S. Cl. ................................. 126/41 R; 126/39 R; 126/39 E; 239/566; 431/354
[58] Field of Search ............ 431/349, 354; 126/21 R, 126/21 A, 39 R, 39 E, 37 R, 41 R, 41 A, 41 B, 41 C, 41 D, 41 E; 239/567, 600, 557, 566

[56] References Cited

U.S. PATENT DOCUMENTS

| | | | |
|---|---|---|---|
| 1,149,686 | 8/1915 | Reedy | 239/553 |
| 1,908,668 | 5/1933 | Hollman | 126/39 E |
| 2,029,718 | 2/1936 | Hobson et al. | 126/41 D |
| 4,055,132 | 10/1977 | Stohrer, Jr. et al. | 72/326 |
| 4,092,975 | 6/1978 | Grammatopoulos | 126/41 R |
| 4,305,372 | 12/1981 | Hahn | 126/41 R |

Primary Examiner—Margaret A. Focarino
Attorney, Agent, or Firm—Richard L. Ward

[57] ABSTRACT

A gas burner construction is porvided which is completely free of any upwardly facing horizontal plane surfaces. This burner construction is especially adapted for cooking food with an open flame since there are no surfaces on which drippings may collect and cause flare-ups.

7 Claims, 17 Drawing Figures